United States Patent [19]
Holley

[11] Patent Number: 5,173,232
[45] Date of Patent: Dec. 22, 1992

[54] PROCESS FOR AGGLOMERATING STACK GAS DESULFURIZATION RESIDUE

[76] Inventor: Carl A. Holley, 14315 Tall Oaks, Riverview, Mich. 48192

[21] Appl. No.: 691,481

[22] Filed: Apr. 25, 1991

[51] Int. Cl.$^5$ .............................................. B29C 67/02
[52] U.S. Cl. .................... 264/113; 23/313 P; 264/117; 264/131; 264/DIG. 49; 425/222
[58] Field of Search .............. 425/222, 425, 332; 264/311, 114, 117, 15, 131, 113, DIG. 49; 23/313 R, 313 P; 118/19, 308, 309; 427/180, 189

[56] References Cited

U.S. PATENT DOCUMENTS

| | | | |
|---|---|---|---|
| 2,860,598 | 11/1958 | Loesche | 425/222 |
| 2,876,491 | 3/1959 | Meyer | 425/222 |
| 3,050,772 | 8/1962 | Von Reppert | 425/222 |
| 3,110,572 | 11/1963 | Von Reppert | 425/222 |
| 3,140,326 | 7/1964 | Erck et al. | 264/117 |
| 3,335,456 | 8/1967 | Teruo Oya et al. | 425/222 |
| 4,064,212 | 12/1977 | Kleeberg et al. | 264/117 |
| 4,112,035 | 9/1978 | Lawrence et al. | 264/117 |
| 4,264,543 | 4/1981 | Valenta | 23/313 P |
| 4,274,836 | 6/1981 | Ban et al. | 44/598 |
| 4,397,742 | 8/1983 | Minnick | 264/DIG. 49 |
| 4,726,755 | 2/1988 | Holley | 425/222 |
| 4,869,846 | 9/1989 | Mouch',acu/e/ et al. | 264/DIG. 49 |
| 4,881,887 | 11/1989 | Holley | 425/222 |
| 4,954,134 | 9/1990 | Harrison et al. | 23/313 R |
| 4,973,237 | 11/1990 | Hajou et al. | 425/222 |
| 4,997,357 | 3/1991 | Eirich et al. | 23/313 R |
| 5,008,055 | 4/1991 | Holley | 23/313 R |
| 5,033,953 | 7/1991 | Holley | 264/117 |
| 5,078,163 | 1/1992 | Holley | 118/417 |

FOREIGN PATENT DOCUMENTS 1300454 6/1962 France .................. 23/313 P

Primary Examiner—Jay H. Woo
Assistant Examiner—Robert B. Davis
Attorney, Agent, or Firm—William J. Ruano

[57] ABSTRACT

A process for producing spherical pellets from stack gas desulfurization residue filter cake. The process includes mixing dry fly ash with a filter cake in a mixer and discharging the blend onto a shallow pan disc pelletizer where pellets are produced. Additional fly ash produces pellets in a reroll ring. Instead of fly ash, cement kiln dust, portland cement, lime kiln dust or lime is utilized.

1 Claim, 2 Drawing Sheets

PROCESS FOR AGGLOMERATING STACK GAS DESULFURIZATION RESIDUE

BACKGROUND OF THE INVENTION

The more stringent air quality standards, recently enacted, have meant that more coal burning combustors must install sulfur dioxide ($SO_2$) removal systems for the stack gases. One popular method is to utilize a lime solution [$CaOH)_2$] with the stack gases bubbling through a film of the solution in a scrubber. In the scrubber, the sulfur dioxide ($SO_2$) in the stack gas reacts with the lime solution [$Ca(OH)_2$] to form calcium sulfate half-hydrate (plaster of Paris) [$CaSO_4.\frac{1}{2}H_2O$] in the residue collected at the bottom of the scrubber. In the residue is also residual lime solution [$Ca(OH)_2$]. This residue is very difficult to handle and is normally filtered on a belt, leaf or drum filter to remove as much water as possible. The remaining filter cake contains from 10 to 20% water by weight and is very difficult to handle.

SUMMARY OF THE INVENTION

I have found that by utilizing the process flow diagram shown in FIG. 1, spherical pellets can be produced which can be handled very easily. In such process, the filter cake is fed into a high intensity mixer together with fly ash which has been collected from the stack gas before the gas is treated to remove the sulfur dioxide.

After pellets are formed in the shallow pan, they are discharged over the edge thereof into a reroll ring.

DESCRIPTION OF THE PREFERRED EMBODIMENT

Figure 1:
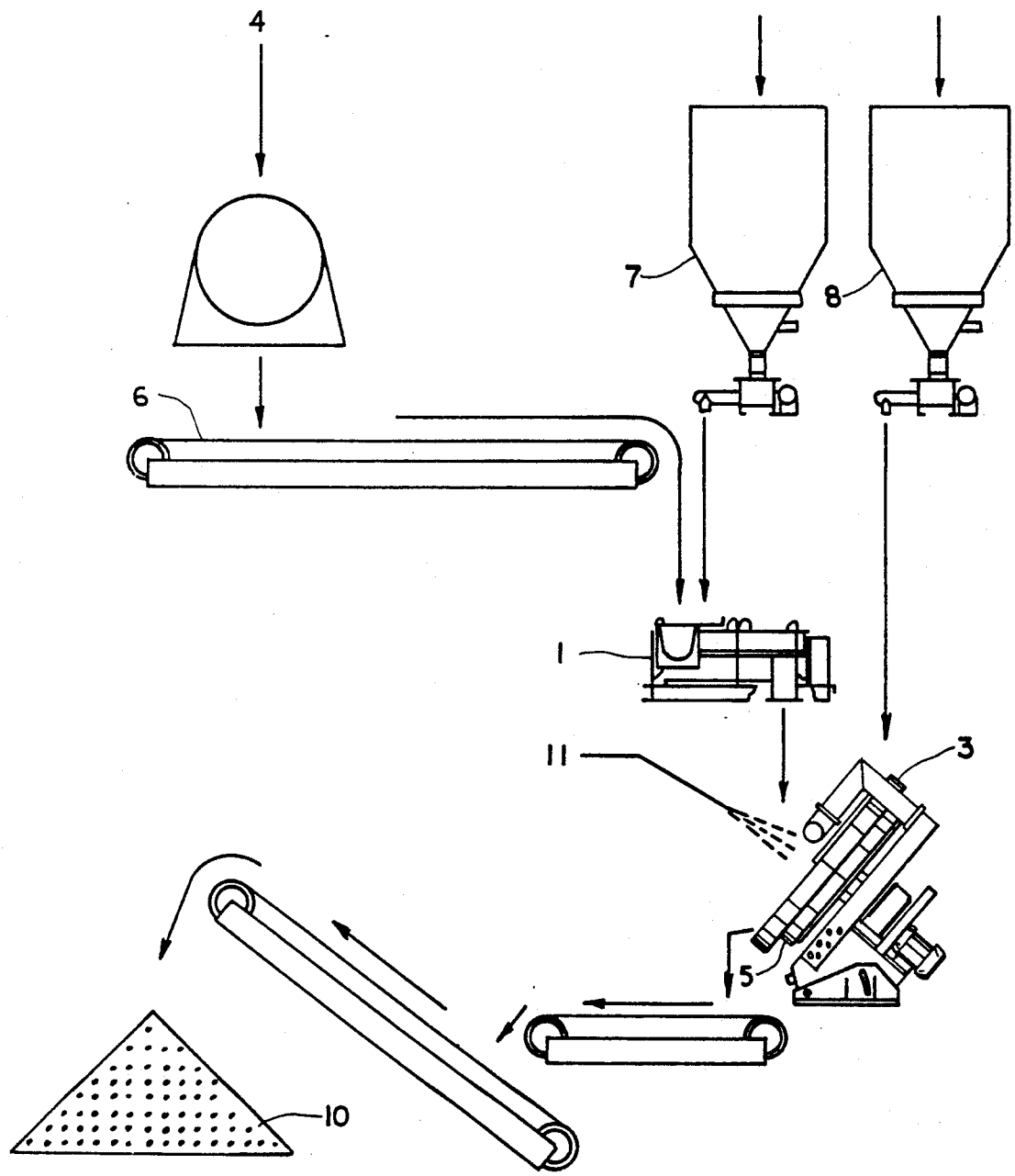
FIG. 1 is a schematic diagram showing the complete process of the present invention.

Referring to FIG. 1, numeral 1 denotes a high intensity mixer, such as shown in more detail in my U.S. Pat. No. 4,881,887 dated Nov. 21, 1989, although the present invention is not dependent on the details of the mixer since any other mixing device that thoroughly mixes is equally satisfactory.

A slurry 4 is passed through a vacuum or belt filter 9 onto a conveyer belt 6 and discharges filter cake of 10% to 20% moisture into the high intensity mixer 1. Fly ash from a surge bin 7 is also fed into mixer 1.

Fly ash from a surge bin 8 is fed into a reroll ring 3 which surrounds the pan 5 of disc pelletizer 2. Because of the larger diameter of the reroll ring and its smaller depth, it is capable of pelletizing effectively to form substantially spherical pellets.

The shallow pan disc pelletizer described in my U.S. Pat. No. 4,726,755 issued on Feb. 23, 1988 is most effective for this application, but almost any commercially available disc pelletizer can be made to function instead. The disc pelletizer should be equipped with a spray system 11 so that water can be added to the rolling material to control the size of the pellets.

The fly ash addition should be 1 to the 10% of the dry weight of residue. In place of the fly ash, cement kiln dust, portland cement, lime kiln dust, lime or plaster of paris may be substituted.

Figure 2:
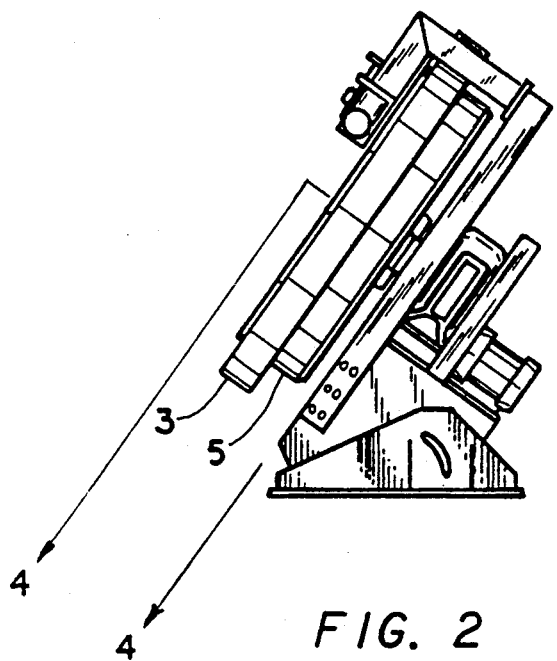
FIG. 2 is a side view of the disc pelletizer.
Figure 3:
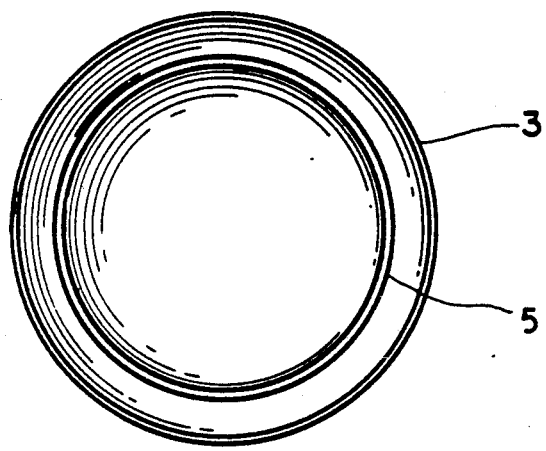
FIG. 3 is a top view of the shallow pan and reroll ring of the pelletizer.
Figure 4:
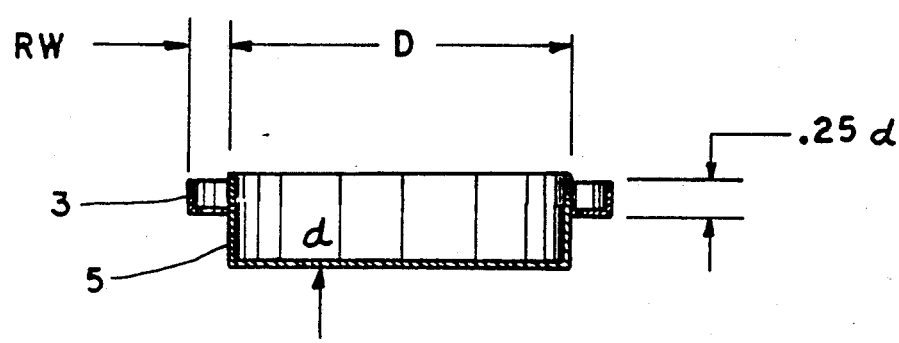
FIG. 4 is a cross-sectional view taken along line 4—4 of FIG. 2.

After pellets are formed in the shallow pan shown in FIGS. 3 and 4 of pelletizer 2, they are discharged over the edge into a reroll ring 3 shown in FIGS. 1 and 2. To have the most satisfactory operation of the disc pelletizer 2, the shallow pan depth should have an exponential relation to the pan diameter and the reroll ring width should also have an exponential relation to the pan diameter. These relationships are:

$d = D^{0.58}$ $RW = D^{0.65}$ d = pan depth in inches

D = pan diameter in inches

RW = width of the reroll ring

The depth of the reroll ring is best established at $\frac{1}{4}$ of the depth of the pan.

Additional fly ash is added to the pellets in the reroll ring Normally from 1 to 5% of the dry weight of the pellets is added in the form of dry fly ash. The fly ash coating reacts with the unreacted lime [$Ca(OH)_2$] to form a pozzuolanic cement which effectively seals the surface of the pellets so the slightly soluble gypsum is not leached out of the pellets. The abovementioned substitutes of fly ash may be used.

The coated pellets exiting the reroll ring are placed in a weather protected stockpile 10. In this weather protected stockpile, the hardening process takes place by the calcium sulfate half-hydrate [$CaSO_4.\frac{1}{2}H_2O$] reacting with the free water to form gypsum [$CaSO_4.2H_2O$] and the fly ash and unreacted lime hydrate to form pozzuolanic concrete. The curing can take one day to three days depending on the temperature and the specific material. After this curing period, the pellets can be stored without any leaching from rain.

While I have illustrated and described a single specific embodiment of my invention, it will be understood that this is by way of illustration only and that various changes and modifications may be contemplated in my invention within the scope of the following claims.:

I claim:

1. A process for producing spherical pellets from stack gas desulfurization residue filter cake of 10% to 20% moisture, before the stack gas has been treated to remove sulphur dioxide, comprising mixing dry fly ash with the filter cake in a high intensity mixer and discharging the blend onto a shallow pan disc pelletizer, where pellets are produced and then coating the pellets in a reroll ring, surrounding the shallow pan disc pelletizer having about $\frac{1}{4}$ the depth of said disc pelletizer, with more fly ash, the proportions of said shallow pan disc pelletizer being:

$d = D^{0.58}$

Where d = pan depth in inches and D = pan diameter in inches.

* * * * *